INVENTOR.
PATRICK E. LANNAN

June 22, 1965 P. E. LANNAN 3,191,038
HORIZON SENSOR FOR SATELLITE ATTITUDE CONTROL
Filed April 28, 1960 4 Sheets-Sheet 2
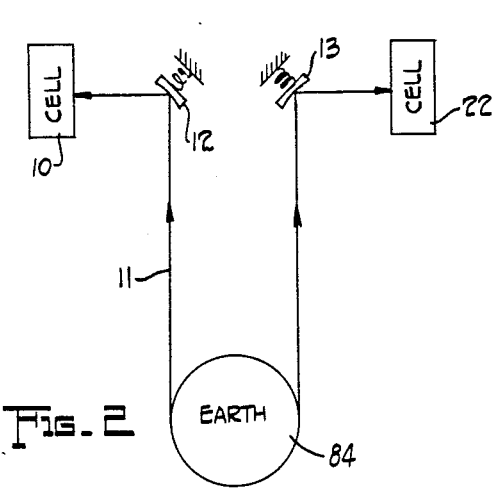
Fig. 2
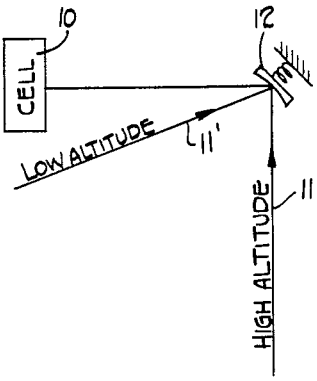
Fig. 3
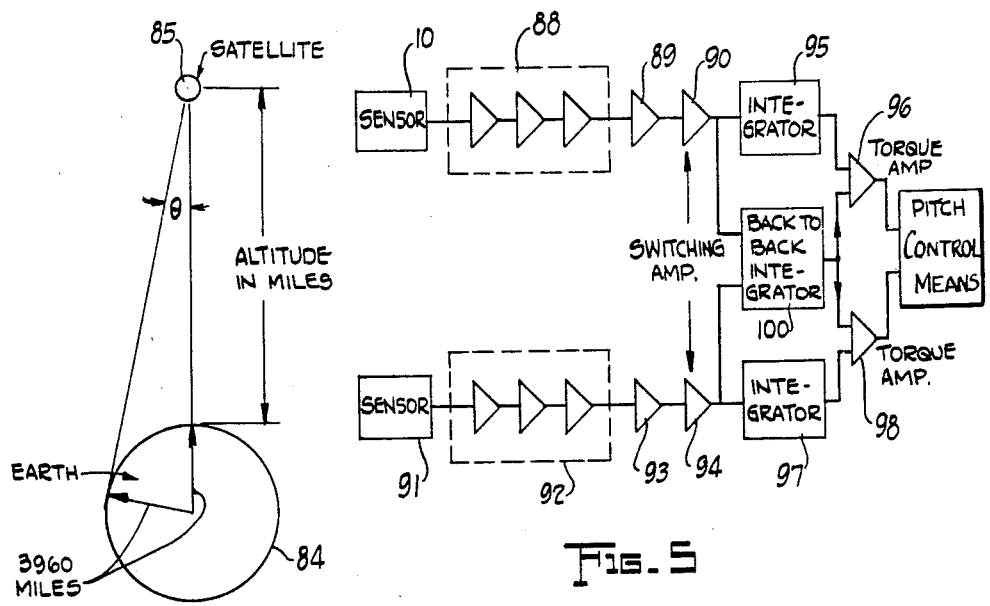
Fig. 4
Fig. 5
INVENTOR.
PATRICK E. LANNAN
BY
Justin V. Macklin
ATTORNEY.

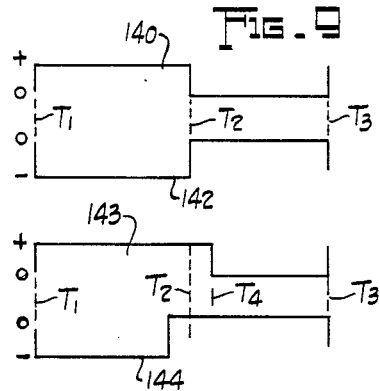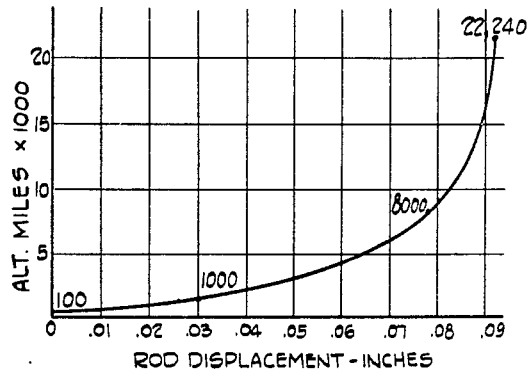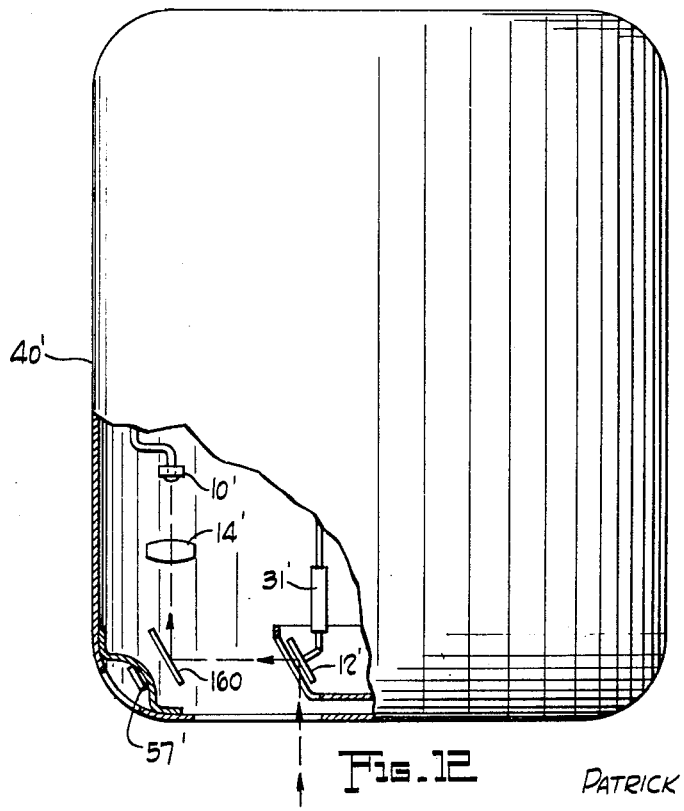

United States Patent Office 3,191,038
Patented June 22, 1965

3,191,038
HORIZON SENSOR FOR SATELLITE
ATTITUDE CONTROL
Patrick E. Lannan, Parma Heights, Ohio, assignor, by mesne assignments, to International Resistance Company, Philadelphia, Pa., a corporation of Delaware
Filed Apr. 28, 1960, Ser. No. 25,444
7 Claims. (Cl. 250—203)

This invention relates to a horizon sensor system for a space-traveling device, and while it is of general utility, it is of particular utility in controlling or minimizing the pitch and roll of an artificial earth satellite after orbital boost, or in controlling the direction of travel of a space-traveling device with reference to an external heavenly body.

Various methods have been proposed for providing a true vertical sensor for a space-traveling device. A vertical sensor is needed at various stages of travel of many space traveling devices. Thus, for earth satellites such a sensor will maintain the orientation in pitch and roll for antenna stabilization. Such a sensor is also of utility in controlling the final injection attitude of a deep-space probe, and can serve as an additional reference for a star-tracking system until the deep-space probe is able to lock on its target, and finally it can utilize the target planet itself to supply control information for terminal guidance.

The basic problem involved in an artificial earth satellite is to maintain the satellite stable about its pitch and roll axis after orbital boost, or, more exactly, to maintain this stability with reference to a certain axis of the satellite pointing directly at the center of the earth.

It has been proposed that the plane of the horizon be sensed with a device having a sensor dependent upon the fact that considerable infra-red radiation, fairly constant in amplitude, is emitted from the earth, while almost none can be received from outer space. In such a device, the infra-red energy received from the earth's surface is reflected into infra-red reflectors, and circuits are provided which can sense the angles at which this energy is present or disappears. These angles are related to the earth's horizon, and from them, a vertical sensing device can be operated. The infra-red energy which is received from such a sensor from one portion of the earth may vary materially from that received from another portion of the earth. This may create an error in a vertical sensor of the general type under consideration, unless some precautions are taken to alleviate or compensate for this difference in energy content.

In applicant's copending application, Serial No. 816,504, filed May 28, 1959, and entitled "Control System for Space Device," there is disclosed and claimed a sensing device in which two scanning devices are used to obtain information as to pitch or roll of an earth satellite. In this arrangement the horizon of the earth is scanned simultaneously on opposite sides, and the transition points, or the points in the scan at which the scanning device is moved from a position where the earth is scanned to a position where space is scanned, or vice versa, are used to provide an indication of the type needed to control the device. These transitions on opposite sides of the earth are detected in applicant's above-mentioned co-pending application with completely separate information channels which are effective at the same time. This eliminates the need for long storage of information which was present in some of the prior systems, and permits the direct comparison between opposite transition channels.

In applicant's copending application, reciprocating scan elements were used in place of fully rotating ones, and this enabled the replacement of all bearings in the unit with spring suspensions. The use of bearings raises the problem as to the greasing or oiling of the bearings in a vacuum. The device of applicant's copending application is particularly effective for a low-altitude unit. Where a unit is needed, however, which must operate sometimes at very low altitudes and at other times at very high altitudes, the devices of the prior art have not been completely satisfactory in solving all of the problems involved.

It is an object of the present invention therefore to provide an improved device for sensing the horizon of a celestial body and for developing a control effect for some characteristic of the space-traveling device with reference to the celestial body.

It is still another object of the invention to provide a control system for reducing the pitch and roll of a space-traveling device with reference to a celestial body to a minimum over a wide range of distances between the space-traveling device and the celestial body.

Still another object of the invention is to provide a control system for a space-traveling device which includes means for scanning a body, such as the earth, with respect to which it is desired to exert a control on a given characteristic of the device, with a scanning system, the sensitivity of which can be varied.

In accordance with a particular form of the invention, a control system for a space-traveling device comprises a first scanning means for scanning, by a radiant energy collector and with a predetermined scanning amplitude, the horizon of a body with respect to which a control is to be established. The body is scanned in such manner that energy is received at different times during the scan from a relatively small portion of the body and a correspondingly small portion of space adjacent the body. The system also includes a second scanning means for scanning the body, simultaneously with the scanning of the first scanning means, by a radiant energy collector and with a predetermined scanning amplitude substantially equal to the predetermined scanning amplitude mentioned above. The scanning direction of the second scanning means is fixed with relation to that of the first scanning means and a different portion of the horizon of the body is scanned to receive energy at different times during the scan of the second scanning means from a relatively small portion of the body and a correspondingly small portion of space adjacent the body. Means are also provided which are responsive to the time relationship between the simultaneous receipt by the above-mentioned first scanning means of energy from the body and from space and the simultaneous receipt by the second scanning means of energy from the body and from space for orienting the space-traveling device in a predetermined manner with reference to the body.

Additional means are provided which are responsive to the ratio of the periods of time at least one of the scanning means is receiving energy from the body and from space in its scanning cycle for reducing the amplitude of scan of each of said scanning means to a small portion of the predetermined scanning amplitude which includes the positions of each at which energy is simultaneously received from the body and from space.

For a better understanding of the present invention, together with other and further objects thereof, reference is had to the following description taken in connection with the accompanying drawings, and its scope will be pointed out in the appended claims.

Referring now to the drawings:

FIGS. 2, 3 and 4 illustrate different characteristics of the device of the invention where the altitude or distance of the space-traveling device from the heavenly body with respect to which a control is to be established is relatively high;

FIG. 5 is a block diagram of a circuit which is used in one portion of the system of the invention for controlling the pitch and roll of the space traveling device;

FIGS. 9 and 10 are curves utilized to illustrate certain operating characteristics of the device;

FIG. 11 is a curve illustrating certain of the operating characteristics of the block diagram of FIG. 8, and FIG. 12 illustrates a modification of the FIG. 1 embodiment of the invention which is useful where it is desired to minimize certain dimensions of the horizon sensor of the invention.

Figure 1:
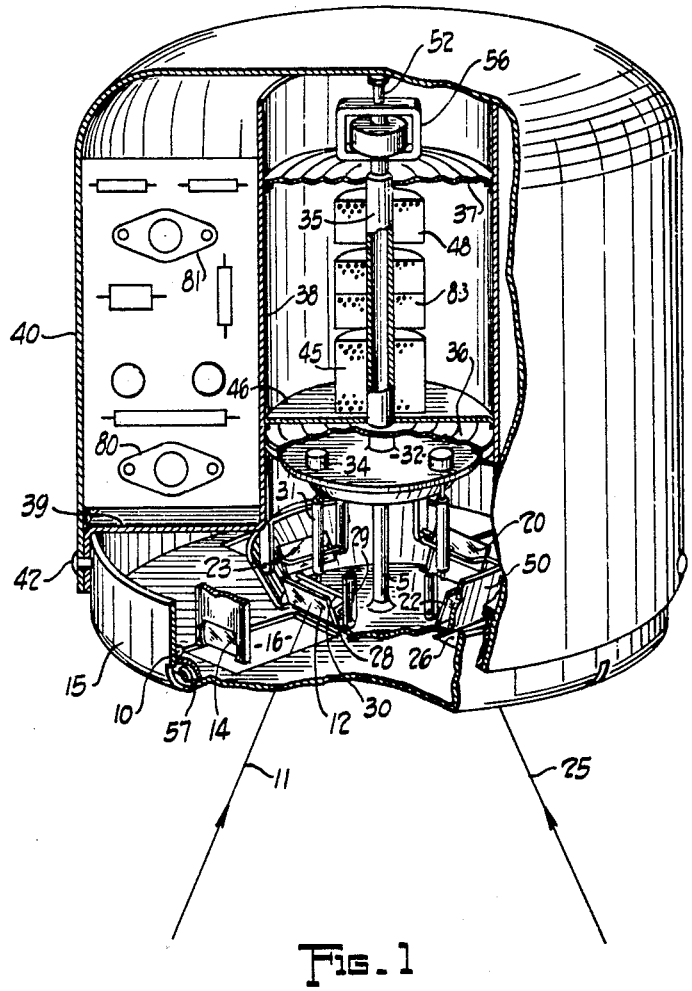
FIG. 1 is an illustration, partially in section, of a device in accordance with the present invention, which is useful for controlling a characteristic, such as the pitch or roll, of an earth satellite.

Referring now more particularly to FIG. 1, there is shown there a control system for a space-traveling device which is useful in controlling a characteristic of the device. Specifically, as pointed out above, the FIG. 1 device may be used for controlling the pitch and roll of an earth satellite in its travel in its orbit about the earth. It will be described in that connection.

The device of FIG. 1 thus includes a scanning means which includes a radiant-energy collector 10. This radiant-energy collector 10 may be a quartz-backed thermistor flake with a time constant of about two milliseconds and an area of about twenty-five square millimeters. Infra-red energy from the celestial object, the horizon of which is being scanned, is received by the radiant-energy collector 10 along the path indicated by the arrow 11. Numeral 12 indicates a mirror which reflects radiant energy received along path 11 through an infra-red lens 14 to the radiant-energy collector 10. The lens 14 is preferably constructed of a single crystal of germanium, which has the property of transmitting infra-red energy. The mirror 12 is moved effectively to scan a portion of the earth and a portion of space adjacent the earth at different times during its scanning cycle, in a manner which will be described in more detail hereinafter.

The units just mentioned are mounted in a housing 15, and the infra-red energy received along path 11 is received by the mirror 12 through an opening 16 in the housing 15. It will be understood that the radiant-energy collector 10 is mounted on one wall of the housing and that the lens 14 is fixed with reference to the housing by some suitable means, not shown.

As pointed out above, the system, including mirror 12, is provided for scanning the horizon of the celestial body involved, such as the earth. This scanning may be done directly ahead of the line of travel of the space-traveling device. When so used, the mirror 12 can be used in a system which senses the pitch of the space-traveling device, and which provides some control effect for the device.

In order to provide a horizon-sensing device which effectively looks towards the rear of the space-traveling device, another similar system is provided which is oriented 180 degrees within the housing 15 from the scanning system, including the mirror 12. This second system is not completely shown in the drawings, but portions of it are shown. One such portion includes a mirror 20 which is in all respects similar to the mirror 12. It will also be understood that other portions of the scanning system including mirror 20 are identical to those described with reference to the elements included in the scanning system comprising mirror 12.

Similarly, mirror systems for scanning the horizon at right angles to the line of scan of mirrors 12 and 20 are provided. A portion of one such mirror is indicated by the reference numeral 22, and a portion of the other of these mirrors is indicated by the reference numeral 23. It will be understood that the scanning system including mirrors 22 and 23 is generally similar to that including the mirrors 12 and 20. It will also be understood that, where the mirrors 12 and 20 as assumed above are included in an arrangement for controlling the pitch of the space-traveling device, the mirrors 22 and 23 are included in an arrangement for controlling the roll of the space-traveling device. The arrow 25 indicates the manner in which infra-red energy is directed to the mirror 22. This energy is received by mirror 22 through an opening 26 in the housing 15, and the opening 26 is similar to the opening 16 previously described. Suitable openings (not shown in detail) are, of course, provided for mirrors 20 and 23.

The mirror 12 is mounted on a wire at each end, one of which is designated by the reference numeral 28. This wire is affixed to a support 29 which, in turn, is affixed to the casing 15 in a manner which is not shown in detail. It will be understood that a similar wire and support (not shown) is provided for the other end of the mirror 12.

A yoke 30 is provided for driving mirror 12 when actuated by a drive rod 31. The drive rod 31 has reduced cross-sections at the ends thereof, as illustrated, for a purpose which will be described in more detail hereinafter. The drive rod 31 is effective to drive the mirror 12 through a relatively wide scanning angle when moved in a vertical direction by the movement in the vertical direction of a spider 32 to which the drive rod 31 is affixed. A means, designated by the reference numeral 34, is provided for adjusting the drive rod 31 vertically with reference to the spider 32. This can be done by means of a threaded portion (not shown) between the two parts, which upon adjustment effect the desired position of mirror 12. The spider 32 is affixed to a driving sleeve 35, which in turn is affixed to two diaphragms 36 and 37. Diaphragms 36 and 37 are, in turn, affixed to a cylinder 38, which is held rigidly upright, in the case of the FIG. 1 device, by means of a disk portion 39 which is affixed to the upper portion 40 of the housing of the FIG. 1 device by suitable rivets, one of which is designated by the numeral 42. Driving sleeve 35 is preferably permanently magnetized. It will thus be seen that vertical movements of the center portions of the disks 36 and 37 are transmitted through the cylindrical drive rod 35 to the spider 32 and thereafter through the drive rod 31 to the yoke 30 to cause a scanning by mirror 12.

In order to move the drive sleeve 35 vertically at a predetermined frequency, a solenoid 45 is provided. This solenoid is affixed to a disk 46, which is in turn rigidly mounted within the cylinder 38. It will be understood that flexibility is provided in the disks 36 and 37 to allow the required vertical movement for effecting the scanning motion of mirror 12. As a matter of fact, the solenoid 45 is, as will be hereinafter described, to be excited at a frequency of one cycle per second, and the disks 36 and 37 are preferably fluted so that they will vibrate at this frequency.

Another solenoid, designated by the reference numeral 48, is provided for driving the sleeve 35 and, hence, the scanning system, at a different frequency (for example a frequency of ten cycles per second). The coil 48 is also rigidly mounted by means (not shown) on disk 46, and disks 36 and 37 are also preferably constructed to vibrate at ten cycles per second, the frequency at which solenoid 48 is to be used, to move the sleeve 35.

In a manner similar to that described in applicant's above-mentioned copending application, the device of FIG. 1 also includes an arrangement for preventing the direct application of the sun's rays to the radiant energy collectors, one of which is represented by the numeral 10.

This device thus includes a mask 50 adapted to be rotated in one direction to cover mirrors 12 and 20 and adapted to be rotated in the other direction to cover mirrors 22 and 23. The mask 50 is only partially shown in FIG. 1 and is there illustrated in its position where mirrors 22 and 23 are covered. The mask 50 is mounted upon a vertical rod 51 which is pivoted to the casing at the top by a pivot 52 and which is pivoted at the bottom to the casing by another pivot (not shown). It will be understood that the rod 51 is contained within the drive cylinder 35 and is freely rotatable with reference thereto. The rod 51 is also journalled in spider 32, being freely movable with respect thereto, both in the vertical direction and in the radial directions.

In order to rotate the mask 50 in one direction to cover one set of mirrors 12 and 20 and to rotate the mask 50 in the other direction to cover the other set of mirrors 22 and 23, a galvanometer arrangement, represented by the reference numeral 56, is provided. This may be of the d'Arsonval type, and includes two sets of operating coils (not shown in detail), one of which is effective to rotate the mask 50 in one direction, and the other of which is effective to rotate the mask 50 in the opposite direction.

In order to cause the movement 56 to rotate the mask 50 in a direction to cover the mirror 12 when the sun comes within the field of scan of mirror 12, a sun-sensing device is provided. This includes a thermocouple 57 mounted in the casing 15 and effective to view the scanning field of mirror 12 through an opening in the bottom of the casing 15. The thermocouple 57 is isolated from the remaining portion within the housing 15 by a wall of baffle.

It will be understood that similar thermocouples are provided for each of the other mirror systems. Also, it will be understood that, when thermocouple 57 is exposed to the direct rays of the sun, it provides an excitation for one of the coils on galvanometer 56 which is effective to rotate the rod 51 and thereby cause the shield 50 to cover the mirror 12.

In a similar manner, the thermocouple (not shown) which is provided for mirror 22 will excite the galvanometer 56 to rotate the shield 50 in the opposite direction and thereby cover mirror 22.

It will be understood that the electronic circuit components which are needed for operation of the device illustrated in FIG. 1, as will be hereinafter described, can be mounted on panels in the space between the housing 40 and the cylinder 38. One such panel is illustrated which includes power transistors 80 and 81 and other circuit elements which are not designated by reference numerals. Alternatively, of course, the circuit components could be mounted on toroidal shaped panels which are included in the space between the cylinder 38 and the housing 40.

In order to provide an indication of the amount of displacement of sleeve 35 within the cylinder 38, a differential transformer 83 is provided. This transformer is mounted fixedly by means (not shown) concentric with the sleeve 35. A more detailed description of the differential transformer 83 will be given hereinafter.

As described in detail in applicant's above-mentioned copending application, the mirror 12, for example, is utilized in operation to scan the earth's horizon. In the copending application, it will be seen that the angle of scan with reference to the line of motion of the satellite was rather small. Where the device is also intended, as in the case of the device of the instant invention, for operation at high altitudes, it is necessary for the mirrors to be able to operate through quite a wide angle. This will be apparent from a consideration of the diagrammatic illustration of FIG. 2, where the mirrors 12 and 20 are illustrated with reference to the earth 84 for a high altitude of the space-traveling device. The cell or radiant-energy collector 10 is represented in block form, and it will be seen that energy which travels along the path 11 is deflected by the mirror almost ninety degrees to the cell 10 under these conditions.

The contrast between this and the low altitude condition is illustrated more clearly in FIG. 3. Again, the numeral 11 represents the path the light travels when the horizon of the earth is scanned by the mirror 12 from a very high altitude. However, the numeral 11' illustrates the path which the energy travels when the horizon of the earth is intercepted from relatively low altitude. It will be seen that the energy traveling over the path 11' is deflected by the mirror 12 through a relatively small angle to the cell 10. In the case of the device of applicant's copending application, for example, it would be necessary for the device to scan through almost ninety degrees, as will be apparent from a consideration of FIGS. 2 and 3, in order to be effective under the two conditions represented there. This would considerably reduce the sensitivity or accuracy of the device, because the transition point under such conditions can represent only a very small portion of the whole scan arc. This loss in accuracy is obviated, in the present invention, by controlling the scan angle so that it sweeps through the large arc until it finds the horizon and then "locks on" and scans back and forth over a very small angle from then on.

The lens 14 of FIG. 1 serves a double purpose, namely, (a) the concentration of infra-red energy which is weak due to the narrow beam, and (b) the filtering out of the earth's albedo or reflected radiation so as to obtain only the black body radiation and, hence, obtain relatively uniform radiation from the entire surface of the earth.

It will be assumed, for purposes of this discussion, that the satellite will have a maximum apogee of 22,240 miles and a minimum perigee of 100 miles. The extreme scanning angles under which the present device must operate will be apparent from a consideration of FIG. 4, where again the earth is represented by the numeral 84 and the satellite is represented by the numeral 85. Taking the case where the altitude is 100 miles, the angle $\theta$ of the line of sight to the vertical is about 77°. The angle $\theta$ at the maximum altitude of 22,240 miles is about 8°. Therefore, for operation under the assumed conditions, the device of FIG. 1 is preferably designed to scan an angle which includes these two tangent angles and to be a total of about 76°. This includes an approximate four degrees on each side of the required scan. Preferably, the scanning beam is rather narrow and fan-shaped to include an observation angle on the circle formed on the horizon of about 4°.

In FIG. 5 there is illustrated a circuit in block form which can be used to control the pitch of the space-traveling device carrying the FIG. 1 horizon sensor. The radiant energy sensing device 10 is illustrated and is shown as connected to a pre-amplifier 88, including three stages of amplification, a voltage amplifier 89, and a switching amplifier 90. The switching amplifier 90 corresponds generally to that illustrated by the reference numeral 64 of applicant's copending application mentioned above.

Similarly, the sensor to which the mirror 20 directs energy is represented in FIG. 5 by the reference numeral 91. The sensor 91 is connected to a pre-amplifier 92, a voltage amplifier 93, and a switching amplifier 94 corresponding, respectively, to those amplifiers connected to sensor 10 which are designated by the numerals 88, 89, and 90.

An integrator 95 is connected to the output circuit of switching amplifier 90 and to the input circuit of a torque amplifier 96. Similarly, an integrator 97 is connected to switching amplifier 94 and supplies energy to a torque amplifier 98. A back-to-back integrator 100 has input circuits connected to switching amplifiers 90 and 94, and an output circuit connected to torque amplifiers 96 and 98. The output circuits of torque amplifiers 96 and 98 are connected to a pitch control circuit or orienting device (not shown). It will be understood that the backto-back integrators and torque amplifiers just described are described in more detail in connection with FIG. 9 of applicant's above-mentioned copending application.

Figure 6:
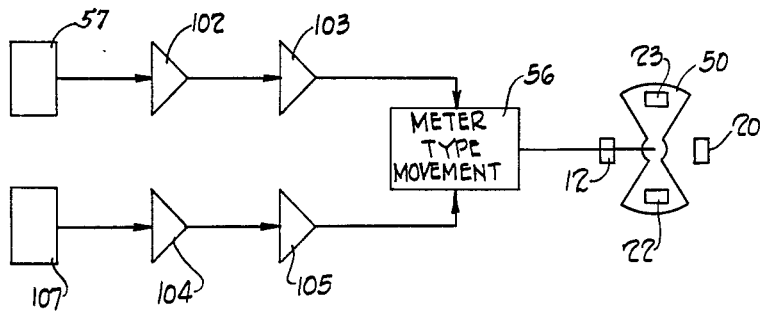
FIG. 6 illustrates in block form a circuit which is used in the illustrated embodiment of the invention to protect the sensing elements against direct rays of the sun.

In FIG. 6 is illustrated in block diagram the circuit arrangement for controlling the movement of shutter 50 of FIG. 1. The thermocouple 57 corresponding to the FIG. 1 showing is connected through amplifiers 102 and 103 to the meter type movement 56. This meter movement, as described above, effectively rotates the mask or shutter 50 in one direction when supplied with energy from the thermocouple 57. It will be understood that the thermocouple associated with mirror 20 also supplies energy to amplifiers 102 and 103 and is effective to rotate the shutter 50 in the same direction as energy from the thermocouple 57.

In order to rotate the mask 50 in the other direction and thus to cover mirrors 22 and 23, another set of amplifiers 104, 105 are provided corresponding respectively to amplifiers 102 and 103. Numeral 107 designates the thermocouples which are not shown in FIG. 1, but which are effective to supply energy in the manner described above when the direct rays of the sun would otherwise fall upon mirror 22 or 23. As brought out above, the mask 50 is illustrated in FIG. 1 and in FIG. 6 as being in the position where mirrors 22 and 23 are covered.

Figure 7:
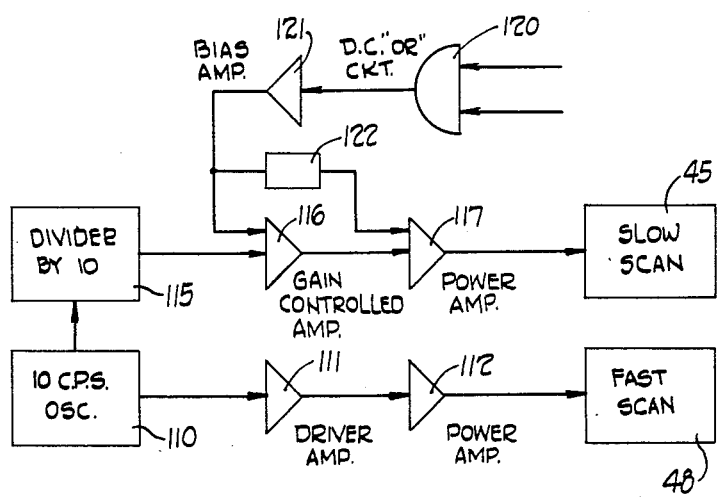
FIG. 7 is a diagram in block form of a circuit which is used to control the scanning sensitivity and frequency of the device of the invention.

In order to drive the spider 32 in a vertical direction, and hence drive the scanning mirrors of the FIG. 1 arrangement, a circuit, represented by the block diagram of FIG. 7, is utilized. This includes an oscillator 110 for providing oscillations at a frequency of ten cycles per second, and the output of this oscillator is supplied through a driver amplifier 111 and a power amplifier 112 to the coil 48 (FIG. 1). A frequency divider 115 is coupled to the output circuit of oscillator 110 and is effective to provide energy at a frequency of one cycle per second. This energy is supplied through an amplifier 116 and a power amplifier 117 to the slow scan solenoid 45 (FIG. 1).

In order to effectuate a wide scanning angle until the position is found at which the earth's horizon is intercepted and thereafter, to hold the scanning angle in the zone and render the slow scanning ineffective, a gain control is provided for amplifiers 116 and 117. Thus, a D.C. "or" circuit 120 is provided for receiving energy from the pitch output circuit illustrated in FIG. 5 or from a roll output which is completely identical to that of FIG. 5. The ouput of the D.C. "or" circuit is supplied to an amplifier 121 and thereafter is utilized to control the gain of amplifier 116 in a manner which will hereafter be described in more detail. The output from amplifier 121 is also used through a long time-constant control circuit 122 to control the gain of power amplifier 117 in a manner which will be hereinafter described in more detail.

Figure 8:
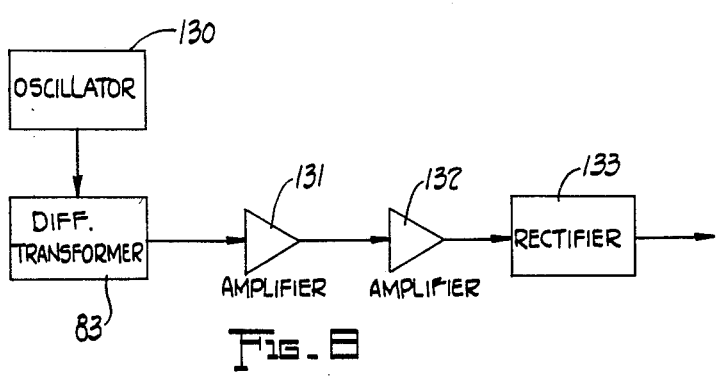
FIG. 8 is a block diagram of a circuit useful in establishing a measurement of the distance between the space-traveling device and the object with reference to which the control device of the invention senses the horizon.

FIG. 8 illustrates in block form the circuit which is utilized to derive an altitude indication from the differential transformer 83 of FIG. 1. One of the coils of the transformer 83 is supplied with an A.C. signal derived from an oscillator 130, and another coil, in response to the movement of sleeve 35, supplies a varying output signal which is amplified in amplifiers 131 and 132 and supplied to a rectifier 133.

Referring now to FIGS. 9 and 10, there is there represented the signal output of the pitch-sensing circuit represented in FIG. 5 under two sets of conditions. In FIG. 9, which corresponds generally to the representation of FIG. 7 of applicant's above-mentioned copending application, there is shown the condition where the sensor 10 and the sensor 91 (FIG. 5) simultaneously intercept the horizon. Under these conditions, energy, as represented by curve 140, is received by sensor 10 from the earth's surface during the interval $T_1$–$T_2$, and thereafter no energy is received by the sensor 10 during the interval $T_2$–$T_3$. This has the effect of generating a positive signal at the output of amplifier 90 during the interval $T_1$–$T_2$ and a signal which is of zero amplitude during the interval $T_2$–$T_3$. Similarly, a negative signal is present at the output of amplifier 94 (FIG. 5) during the interval $T_1$–$T_2$, as represented by curve 142, and this signal is of zero amplitude during the interval $T_2$–$T_3$. Due to the integrators and the differential combination of the signals, there is thus no resultant signal present between the output leads from torque amplifier 96 (FIG. 5) and torque amplifier 98 under the conditions assumed.

Consider now the conditions which exist when the horizon is not intercepted simultaneously by the scanning system supplying sensor 10 and sensor 91 of FIG. 5. Under these conditions, it will be assumed that the scanning system supplying sensor 10 intercepts the horizon at time $T_4$, which is later than the time $T_2$. Therefore, the signal could vary as represented by curve 143 of FIG. 10.

It will be seen that, under the assumed conditions, the mirror supplying sensor 91 would intercept the horizon at a correspondingly earlier time before $T_2$, and that the signal delivered by amplifier 94 of FIG. 5 would vary as represented by the curve 144 (FIG. 10). This would have the effect of causing positive output pulses to be present between output terminals from torque amplifier 96 and torque amplifier 98. These, as explained in applicant's above-mentioned copending application, can be used to control the pitch of the satellite to reduce the time differential between the interception to the conditions illustrated in FIG. 9.

The signal can also be used to control the gain of amplifier 116 (FIG. 7) so that the slow scan coil 45 (FIG. 1) is caused to decrease the scanning amplitude as the error in the system is reduced. Preferably, the amplitude of the slow scan provided by coil 45 is zero at the time the conditions represented in FIG. 9 exist. Under these conditions there is no low frequency scanning present in the system, and the scanning is completely controlled by the fast scan solenoid 48. The pulse output, which is present between the output leads of torque amplifier 96 (FIG. 5) and torque amplifier 98, is also utilized through the slow scan solenoid 45 to control the "D.C. position" of the scanning mirrors so that the high frequency scan effected by solenoid 48 will intercept the horizon in a proper manner. It will be apparent that this condition is effectuated because, as illustrated above, positive pulses are supplied to unit 120 when the conditions represented by FIG. 10 exist, and, conversely, negative pulses are applied when the mirror supplying sensor 91 intercepts the horizon at a later time that $T_2$.

The differential transformer 83, as described above in connection with FIG. 8, is supplied with oscillations from oscillator 130. In one representative embodiment of the device, the differential transformer can be so proportioned that variations of the position of driving sleeve 35, corresponding to the variations needed to produce the scanning angles mentioned above, cause an output from the differential transformer 83, which after rectification, can be calibrated to provide altitude readings as indicated in FIG. 11.

While applicant has described his invention in connection with an earth satellite, it will be apparent that the same type of control can be used with reference to any other suitable celestial body. Also, while applicant has described an arrangement in which the control effected is a pitch and roll control, it will be apparent that the device of the invention can be used as a guiding system for the space-traveling device with reference to the celestial body from which the control effect is obtained.

The device of the invention is capable of operation in a vacuum so that pressurization is not needed. Also, since grease in a vacuum will evaporate and since bearings require grease, the device of the invention utilizing spring suspensions is not subject to these difficulties.

The device of the invention must, of course, operate in zero gravity. Therefore, spring suspensions for the scanning mirrors and the control systems for the mirrors serve to return the parts to equilibrium. The lack of gravity also means that no unbalanced rotational torques can be tolerated since they result in rotation of the vehicle. Applicant's system provides an arrangement by which reciprocal motions have been utilized in place of rotary motions.

It will be understood that an arrangement (not shown) can be provided for locking up and supporting all mechanical movement during the time that the space vehicle is receiving thrust.

In FIG. 12 there is illustrated in a schematic form an arrangement of elements which may be used where it is essential to reduce the volume. Thus, in FIG. 11, a mirror 12' is shown which corresponds generally to mirror 12 of FIG. 1. Other elements which are similar to those in FIG. 1 have been designated by identical reference numerals primed. In the FIG. 12 arrangement, a second mirror 160 has been utilized to deflect the energy to the sensing device 10'.

Considering the operation of the system which has just been described, it will be seen that the mirror 12' and solenoid 45 can be considered to be included with a first means for scanning, by a radiant energy collector and with a predetermined scanning amplitude, the horizon of a body with respect to which a control is to be established. This first scanning means is adapted to receive energy at different times during the scan from a relatively small portion of the body and a correspondingly small portion of space adjacent the body. In other words, during the precise instant of horizon interception, energy is received simultaneously from space and from the body. Prior to that time, energy may be received only from the body space, and after that time, energy may be received only from space, as represented by the curve 140 of FIG. 9.

In the same manner, the mirror 20 and solenoid 45 can be considered to be included in a second scanning means for scanning, simultaneously with the scanning of the first scanning means mentioned above, by a radiant energy collector and with a predetermined scanning amplitude substantially equal to the above-mentioned predetermined scanning amplitude. This second scanning means scans with a scanning direction which is fixed with relation to that of the above-mentioned first scanning means, a different portion of the horizon of the body. It is effective to receive energy at different times during the scan of the second scanning means from a relatively small portion of the body and a correspondingly small portion of space adjacent the body. Actually, as described above in the FIG. 1 arrangement, the first scanning means, including mirror 12 and solenoid 45, and the second scanning means, including mirror 20 and solenoid 45, are intended to have scanning directions which differ by 180 degrees. In the same manner, the mirror 12 and solenoid 48 can be considered to be included in a third scanning means for scanning, by a radiant energy collector and with a scanning amplitude which is much smaller than the predetermined scanning amplitude mentioned above. This third scanning means scans with a scanning direction which is nearly the same, or, as illustrated, exactly the same, as the scanning direction of the above-mentioned first scanning means. Similarly, the mirror 20 and the solenoid 48 can be considered to be included in a fourth scanning means for scanning, by a radiant energy collector and with a scanning amplitude which is much smaller than the above-mentioned predetermined scanning amplitude. This fourth scanning means scans with a scanning direction which is near or the same as that of the scanning direction of the above-mentioned second scanning means.

The system as presently considered can then also be considered to have means responsive to the time relationship between the simultaneous receipt by the above-mentioned first scanning means of energy from the body and from space (or in other words, the horizontal intercept) and the simultaneous receipt by the above-mentioned second scanning means of energy from the body and from space for orienting the above-mentioned third and fourth scanning means, so that the horizon is included in the field of scan by each of the above-mentioned third and fourth scanning means. This is done, of course, by the action of the gain control arrangements, which are effective upon the slow scan coil 45.

As presently considered, the system also includes means responsive to the time relationship between the simultaneous receipt by the above-mentioned third scanning means of energy from the body and from space, or, in other words, the horizon intercept, and the simultaneous receipt by the above-mentioned fourth scanning means of energy from the body and from space for controlling a characteristic of the space-traveling device.

While there have been described what are presently considered to be the preferred embodiments of this invention, it will be obvious to those skilled in the art that various changes and modifications may be made therein without departing from the invention, and it is therefore aimed to cover all such changes and modifications as fall within the true spirit and scope of the invention.

What I claim is:

1. A scanning system for use in the control of the attitude of a space-travelling device comprising: a first scanning means including a radiant energy collector for scanning independently of the motion of said device and with a predetermined scanning amplitude the horizon of a body with respect to which a control is to be established to receive energy at different times during said scan from a relatively small portion of said body and a correspondingly small portion of space adjacent said body; a second scanning means including a radiant energy collector having a scanning direction which is fixed with relation to that of said first scanning means for scanning independently of the motion of said device and with a predetermined scanning amplitude substantially equal to that of said first scanning means a different portion of the horizon of said body to receive energy at different times during said scan of said second scanning means from a relatively small portion of said body and a correspondingly small portion of space adjacent said body; means for simultaneously operating said first scanning means and said second scanning means; means responsive to the time relationship between the simultaneous receipt by said first scanning means of energy from said body and from space and the simultaneous receipt by said second scanning means of energy from said body and from space for operating means to control the attitude of said device; and means responsive to the ratio of the periods which at least one of said scanning means is receiving energy from said body and from space in its scanning cycle for reducing the amplitude of scan of each of said scanning means to a small portion of said predetermined scanning amplitude which includes the positions of each at which energy is simultaneously received from said body and from space.

2. A scanning system in accordance with claim 1 in which the scanning direction of the second scanning means is 180 degrees apart from the scanning direction of the first scanning means.

3. A scanning system in accordance with claim 1 in which the means responsive to the ratio of the periods at least one of the scanning means is receiving energy from the body and from space for reducing the amplitude of scan of each of the scanning means simultaneously effectively increases the frequency of the scan.

4. A scanning system for use in the control of the attitude of a space-travelling device comprising: a first scanning means including a radiant energy collector for scanning independently of the motion of said device and with a predetermined scanning amplitude the horizon of a body with respect to which a control is to be established to receive energy at different times during said scan from a relatively small portion of said body and a correspondingly small portion of space adjacent said body; a second scanning means including a radiant energy collector having a scanning direction which is fixed with relation to that of said first scanning means for scanning independently of the motion of said device and with a predetermined scanning amplitude substantially equal to that of said first scanning means a different portion of the horizon of said body to receive energy at different times during said scan of said second scanning means from a relatively small portion of said body and a correspondingly small portion of space adjacent said body; means for simultaneously operating said first scanning means and said second scanning means; a third scanning means including a radiant energy collector for scanning independently of the motion of said device and with a scanning amplitude which is smaller than said predetermined amplitude a scanning direction which is substantially the same as the scanning direction of said first scanning means; a fourth scanning means including a radiant energy collector for scanning independently of the motion of said device and with a scanning amplitude substantially equal to that of said third scanning means a scanning direction which is substantially the same as the scanning direction of said second scanning means; means for simultaneously operating said third scanning means and said fourth scanning means; means responsive to the time relationship between the simultaneous receipt by said first scanning means of energy from said body and from space and the simultaneous receipt of said second scanning means of energy from said body and from space for operating means to orient said third and fourth scanning means so that said horizon is included in the field scanned by each; and means responsive to the time relationship between the simultaneous receipt by said third scanning means of energy from said body and from space and the simultaneous receipt by said fourth scanning means of energy from said body and from space for operating means to control the attitude of said device.

5. A scanning system in accordance with claim 4 in which the scanning direction of the second scanning means is 180 degrees apart from the scanning direction of the first scanning means.

6. A scanning system in accordance with claim 4 in which the third and fourth scanning means have a scanning frequency considerably higher than the scanning frequency of the first and second scanning means.

7. A scanning system in accordance with claim 4 in which the means for operating the first and second scanning means and the means for operating the third and fourth scanning means are solenoid driven.

References Cited by the Examiner

UNITED STATES PATENTS

| 2,897,369 | 7/59 | Ketchledge | 250—83.3 |
| 3,090,583 | 5/63 | Behun et al. | 244—14 |

OTHER REFERENCES

McCartney, E. J.: "A Horizon Seeker For Atmospheric Re-entry," Advances in Astronautical Sciences (1958), vol. 4, pp. 86–97, Plenum Press, New York, 1959.

RALPH G. NILSON, *Primary Examiner.*

FREDERICK M. STRADER, CHESTER L. JUSTUS, SAMUEL FEINBERG, *Examiners.*